Figure 1:
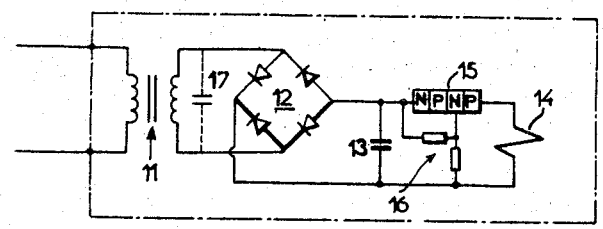

INVENTOR
FERDY MAYER

United States Patent Office 3,312,875
Patented Apr. 4, 1967

3,312,875
RELAY CONTROL FOR SYSTEMS DISTRIBUTING ELECTRIC ENERGY
Ferdy Mayer, 22 Rue Ampere, Grenoble, France
Filed Feb. 26, 1963, Ser. No. 260,975
Claims priority, application France, Feb. 28, 1962, 889,474
3 Claims. (Cl. 317—147)

I have already described in my copending application Ser. No. 126,384, of which the present application is a continuation-in-part, an arrangement for controlling an electric relay wherein the energizing winding of said relay is inserted in series with an electronic cut-off threshold switch across the terminals of means for storing electric energy, said electronic switch becoming conductive under the action of a control signal, say under the action of an increase in voltage across the terminals of the electric energy storing means which is loaded at least partly by said control signal, whereby the release of said relay is ensured by the sudden discharge into the latter of the energy built up in said storing means.

Such an arrangement allows obtaining, starting from a conventional relay showing only a low sensitivity, a comparatively cheap circuit showing a very high sensitivity for signals having a very reduced amplitude and lasting a predetermined time, or repeated several times or succeeding one another.

My present invention covers certain novel applications of such a control system, chiefly for the distribution of emergency information, measuring information and the like through the agency of a system feeding electric energy.

An important object of my invention consists in the provision of an independent alarm system adapted to be actuated starting from a central station adapted to distribute through energy-distributing means, a signal having a frequency different from that of the mains; such an arrangement includes a circuit tuned to said signal frequency and connected with the mains, rectifying means, means for storing electric energy across the output terminals of the rectifying means, an electronic cut-off threshold switch across the terminals of the means storing electric energy, in series with the energizing winding of an alarm relay.

A further object of my invention consists in providing a remote measuring receiver subjected to the action of a distributing system; to this end, I resort to an arrangement of the type disclosed hereinabove, in association, generally speaking, with a further tuned system on the downstream side of the energy-storing means.

According to a further feature of my invention, the means for storing electric energy are constituted by two condensers in series and oppositely polarized, one of the condensers being shunted by a Zener diode of which the releasing threshold is higher than the voltage appearing across the terminals of said condenser for normal values of a controlled electric parameter; such an arrangement allows controlling any electric parameter such as intensity of voltage with reference to a datum value.

Figure 2:
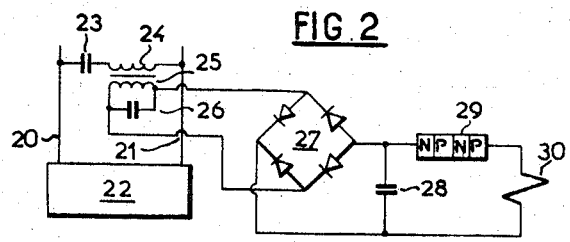
Figure 3:
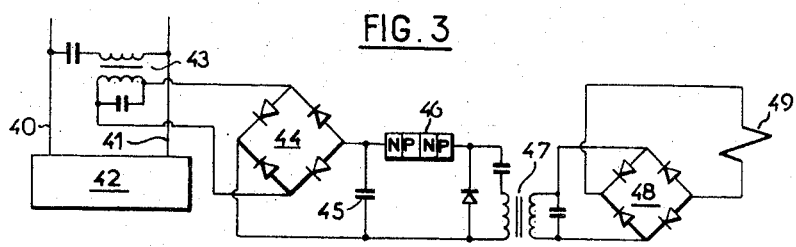
Figure 4:
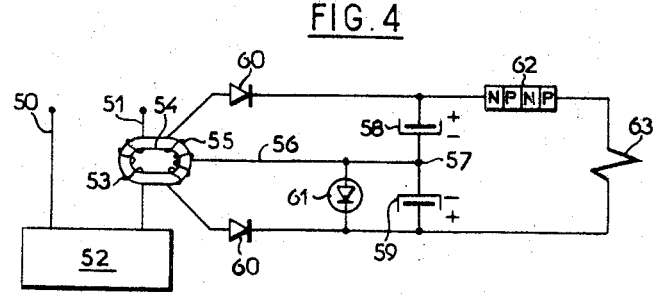

The features and advantages of the present invention will appear clearly from the following description given, by way of example, reference being made to the accompanying diagrammatic drawings wherein:

FIG. 1 is a wiring diagram illustrating the principle of a control system.
FIG. 2 illustrates an alarm system.
FIG. 3 illustrates a remote measuring system.
FIG. 4 is a wiring diagram of an arrangement sensitive to excessive current values.

In FIG. 1 illustrating the principle of a highly sensitive relay according to my invention, an input booster transformer 11 has its secondary winding connected with a rectifying bridge 12 loaded by a condenser 13. Across the terminals of said condenser 13 is inserted the energizing winding 14 of the relay which is not illustrated in detail, said winding being arranged in series with a cut-off threshold electronic switch such as a diode 15 of the NPNP type, the releasing threshold of which is defined by suitable biasing means illustrated diagrammatically at 16. The input transformer may advantageously be tuned to the frequency of the signal, as illustrated by the condenser 17.

This forms a highly sensitive relay adapted to be energized by a signal having a very reduced power, which is applied to the primary of the transformer 11, provided however the duration of said signal is sufficient. Thus, for instance, with a power of only a few milliwatts, it is possible to provide operation of a relay of a power above 100 milliwatts.

FIG. 2 shows an alarm system resorting to a relay of the type referred to hereinabove and adapted to be connected with a distributing system, say a one-phase system 20-21 feeding a receiver 22 or the like. A circuit tuned to a predetermined frequency which is different from the frequency of the distributing means, includes a condenser 23 in series with an inductance 24 inserted across the leads 20 and 21. The inductance 24 is coupled with a secondary circuit including a further inductance 25 shunted by a tuning condenser 26 and feeding a rectifying bridge 27 loaded by a condenser 28 across the terminals of which are inserted in series a diode 29 and the energizing winding 30 of an alarm relay.

Thus, by superposing over the current from the mains which is at a commercial frequency of 50 or 60 cycles, a signal of a higher frequency, say 500 cycles, having a comparatively reduced amplitude, but the duration of which is comparatively long, it is possible to produce the selective loading of the condenser 28 and, consequently, the operation of the alarm device 30. Such a signal may be fed by a central station and it is found that with a transmitting power which is comparatively low, for instance of a magnitude of 1 kilowatt, it is thus possible to produce an alarm in a large number of separate receivers or the like, since, generally, it is sufficient to obtain a useful signal of a power of the order of one milliwatt.

FIG. 3 shows a remote measuring device incorporating a relay arrangement of the type described hereinabove and adapted to be actuated, in the present case, by a signal at an unvarying frequency and of a variable amplitude which is superposed on the commercial frequency current of a one-phase distributing circuit 40–41 feeding a receiver 42. The signal collected by the tuned circuit 43 is applied through the rectifying bridge 44 across the terminals of a condenser 45 coupled in its turn through the agency of a cut-off threshold diode 46 with the primary of a tuned transformer 47, said primary circuit being shunted by a diode. The secondary of said transformer feeds, through the agency of a rectifying bridge 48, the winding of the remote measuring relay 49.

By superposing on the current fed by the mains 40–41 a signal at an unvarying frequency and of a varying amplitude, there is obtained across the terminals of the tuned transformer 47 a series of impulses produced each by a discharge of the integrating condenser 45, the frequency of repetition of said impulses rising obviously as a function of the amplitude. An amplitude modulation of the signal is thus transformed into a frequency modulation and the tuned transformer 47 forms a filter adapted to act consequently as an amplitude selector.

Instead of resorting to a relay fed with D.C. by a voltage which has been rectified at the output of the oscillating circuit 47, it is obviously possible to cut out said oscillating circuit and to replace it by a tuned vibratory relay. It is also possible, of course, to provide, on the other hand, an arrangement in parallel of a plurality of relays tuned to different frequencies.

According to a further modification, it is possible to replace the signal carried by an unvarying frequency of a variable amplitude by a signal provided by a variable carrier frequency. Of course, in all cases, it is possible to amplify the receiving signal to a substantial extent by replacing the diode 46 by an amplifying triode circuit of the NPN or PNP type wherein the signal received is applied to the control electrode.

FIG. 4 shows a wire 51 of a one-phase distributing system feeding a load 52 and in which is inserted the primary winding 53 of a transformer 54 of which the secondary 55 is connected through its medial tapping 56 with a terminal 57 common to two condensers 58 and 59, while the other terminals of last-mentioned condensers mounted in opposite relationship, are connected respectively with the two other terminals of the secondary 25 through rectifying diodes 60.

Across the terminals of one of the condensers, say the condenser 59, is inserted a Zener diode 61. The discharge circuit of the condensers includes a junction diode 62 of the NPNP type inserted in series with the winding 63 of a relay. When the current absorbed by the receiver is normal or does not rise above an allowable over current value, the condensers 58 and 59 are loaded by equal and opposite amounts, so that the voltage across the terminals of the diode 62 is equal to zero.

In the case of an excess current, the voltage across the terminals of the condensers 58-59 rises and, at predetermined moments, corresponding to a predetermined threshold of excess current, the Zener diode becomes conductive and blocks the voltage across the terminals of the condenser 59 and limits it to a constant level corresponding to the diode threshold. In contradistinction, the voltage across the terminals of the condenser 58 continues rising and the difference in voltage between the condensers 58 and 59 releases the diode 62 which becomes conductive and allows a differential discharge of the condenser system 58-59 through the winding 63.

Normally, the capacities of the condensers 58-59 are equal, but, obviously, it is possible to give them different values. Thus, for instance, if the capacity of the condenser 58 is larger than that of the condenser 59, the relay 63 may be energized several times, since, after a first discharge, the voltage in the condenser 58 rises speedily again, whereas the voltage across the condenser 59 remains practically zero.

Of course, instead of making the relay 63 react to an excess current, it is a simple matter to resort to conventional wiring diagrams to make it react to a sub-normal intensity, for an overvoltage or for an undervoltage. With a view to adjusting the datum value, it is possible to act efficiently on various parameters and, in particular, on the number of convolutions of the primary and of the secondary, on the breadth of the gap in the transformer and the like parameters.

What I claim is:

1. Equipment for the reception of alarm information carried by A.C. mains from a central station which distributes through said mains an alarm signal having a frequency different from that of said mains, comprising at least one individual alarm receiver, said receiver comprising a primary circuit connected across the mains, a secondary circuit inductively coupled to the said primary circuit, at least one of said primary and secondary circuits comprising first A.C. energy-storing means tuned to the frequency of said alarm signal, rectifying means, second D.C. energy-storing means loading said rectifying means, an electronic cut-off threshold switch, and electromagnetic relay alarm means, the said electronic switch connecting said second energy-storing means with the electromagnetic relay alarm means to discharge the said second energy-storing means through the said electromagnetic relay alarm means.

2. Equipment for the control of remote measuring devices via A.C. mains from a central station which distributes through said mains a control signal having a frequency different from that of said mains and a variable amplitude, comprising at least one control signal receiver, said receiver comprising a primary circuit connected across the mains, a secondary circuit inductively coupled to the said primary circuit, at least one of said primary and secondary circuits comprising first A.C. energy-storing means tuned to the frequency of said control signal, first rectifying means, second D.C. energy-storing means loading said first rectifying means, an electronic cut-off threshold switch, transformer means tuned to a predetermined frequency, second rectifying means, and electromagnetic relay measuring means fed by said second rectifying means, said transformer means comprising a transformer primary circuit and a transformer secondary circuit inductively coupled with each other, at least one of said transformer circuits comprising tuner means tuned at the said predetermined frequency, the said electronic switch connecting said second energy-storing means with the said transformer primary circuit for successive discharges of the said second energy-storing means through the said transformer primary circuit with a discharge frequency the value of which is a function of the amplitude of the said control signal, and the said transformer secondary circuit actuating the said electromagnetic relay measuring means when the said discharge frequency reaches the said predetermined frequency.

3. Equipment actuable by signals carried by an A.C. system upon passage of an electric overload therethrough, comprising energy-storing means including two condensers connected in series across cooperating terminals in opposed polarity relationship with each other; an electronic cut-off threshold switch; electromagnetic relay means, the said electronic switch connecting said energy-storing means with said electromagnetic relay means to feed the latter with the discharge from said condensers in opposite relationship; rectifying coupling means inserted in series between the said A.C. system and the outer terminals of the corresponding condensers to apply thereto a rectified voltage the value of which is a function of said signals; and means shunting one of the condensers to oppose its loading to a voltage above a value reached upon said overload.

References Cited by the Examiner

UNITED STATES PATENTS

| | | | |
|---|---|---|---|
| 1,783,820 | 12/1930 | Allen | 317—147 X |
| 2,917,698 | 12/1959 | Petrocelli. | |
| 2,960,637 | 11/1960 | Luscher | 317—147 |
| 3,030,523 | 4/1962 | Pittman | 317—148.52 |
| 3,105,174 | 9/1963 | Carson et al. | 317—148.52 |
| 3,119,047 | 1/1964 | Michalski | 317—147 X |
| 3,157,829 | 11/1964 | Wood | 317—148.52 |
| 3,214,641 | 10/1965 | Sonnemann. | |

MILTON O. HIRSHFIELD, *Primary Examiner.*

SAMUEL BERNSTEIN, *Examiner.*

L. T. HIX, *Assistant Examiner.*